United States Patent
Kim et al.

(10) Patent No.: US 9,493,091 B2
(45) Date of Patent: Nov. 15, 2016

(54) DRIVING CIRCUIT FOR HYBRID ELECTRIC VEHICLE AND CONTROLLING METHOD THEREOF

(71) Applicant: Samsung Electro-Mechanics Co., Ltd., Suwon-si (KR)

(72) Inventors: Han Tae Kim, Suwon-si (KR); Min Sup Song, Suwon-si (KR); Young Dong Son, Suwon-si (KR); Kyeoung Hun Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 67 days.

(21) Appl. No.: 14/690,723

(22) Filed: Apr. 20, 2015

(65) Prior Publication Data

US 2015/0298571 A1 Oct. 22, 2015

(30) Foreign Application Priority Data

Apr. 21, 2014 (KR) .................. 10-2014-0047223
Sep. 5, 2014 (KR) .................. 10-2014-0118969

(51) Int. Cl.

| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60L 11/18* | (2006.01) |
| *B60L 15/00* | (2006.01) |

(52) U.S. Cl.
CPC .......... *B60L 11/1861* (2013.01); *B60L 11/005* (2013.01); *B60L 11/1814* (2013.01); *B60L 15/007* (2013.01); *Y02T 10/7005* (2013.01); *Y02T 10/7022* (2013.01); *Y02T 10/7241* (2013.01); *Y10S 903/907* (2013.01)

(58) Field of Classification Search
CPC ................ B60L 11/005; B60L 11/1814; B60L 15/007
USPC ........................................................ 701/22
See application file for complete search history.

(56) References Cited

FOREIGN PATENT DOCUMENTS

KR        10-1088415 B1        12/2011

*Primary Examiner* — Maceeh Anwari
(74) *Attorney, Agent, or Firm* — NSIP Law

(57) ABSTRACT

There is provided a driving circuit for a hybrid electric vehicle, including a first battery and a second battery, an inverter for converting an applied voltage to the form of direct current (DC) or alternating current (AC) according to the operating mode of the motor, a converter operating in a boost mode or a buck mode according to the operating mode of the motor, and a processor for comparing a voltage ($V_{B1}$) of the first battery and a voltage of a DC-link capacitor and controls electrical connection between the first battery, and the inverter and the converter during start-up, wherein the DC-link capacitor is connected in parallel to the first battery, the inverter, and the converter.

12 Claims, 4 Drawing Sheets

DRIVING CIRCUIT FOR HYBRID ELECTRIC VEHICLE AND CONTROLLING METHOD THEREOF

CROSS-REFERENCE TO RELATED APPLICATION

This application claims the benefit of Korean Patent Application No. 10-2014-0118969, filed on Sep. 5, 2014, entitled "Driving Circuit for Hybrid Electric Vehicle and Controlling Method Thereof" and Korean Patent Application No. 10-2014-0047223, filed on Apr. 21, 2014, entitled "Driving Circuit for Hybrid Electric Vehicle and Controlling Method Thereof" which is hereby incorporated by reference in its entirety into this application.

BACKGROUND

The present disclosure relates to a driving circuit for a hybrid electric vehicle and a controlling method thereof.

A hybrid electric vehicle refers to an automotive vehicle driven using two power sources, is referred to as an HEV, is configured in such a way that the power sources with different characteristics operate complementarily to each other so as to enhance efficiency, and mainly uses a method using both a conventional internal combustion engine and an electric motor.

Engine output is compensated for using an electric motor in a driving area with relatively low engine efficiency or a vehicle is driven using only motor output without engine operation in a low-speed driving section with excellent characteristic of the electric motor, thereby improving overall fuel efficiency of the vehicle.

The present disclosure relates to a system for controlling power of an electric vehicle and a current green car, and more particularly, to a mild hybrid electric vehicle (MHEV) system including a battery (48 V), an inverter, a DC_DC converter, and a motor. Here, the DC_DC converter has bidirectional functions of boosting 12 V to 48 V and bucking 48 V to 12 V.

RELATED ART DOCUMENT

Patent Document (Patent Document 1) 2011-0073638KR

SUMMARY

An aspect of the present disclosure may provide a driving circuit for a hybrid electric vehicle and a controlling method thereof, for preventing surge current at a portion in which a battery, a converter, and so on are electrically connected during start-up of a mild hybrid electric vehicle (MHEV) system even without a pre-charge circuit.

According to an aspect of the present disclosure, a driving circuit for a hybrid electric vehicle and a controlling method thereof may prevent surge current that may be generated during an electrical connection procedure of a main battery, a converter, and so on during a start-up procedure of an MHEV system by charging an inverter and a converter with the same voltage as an output voltage of a main battery using an auxiliary battery and then electrically connecting the inverter and the converter with the main battery without a pre-charging circuit.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
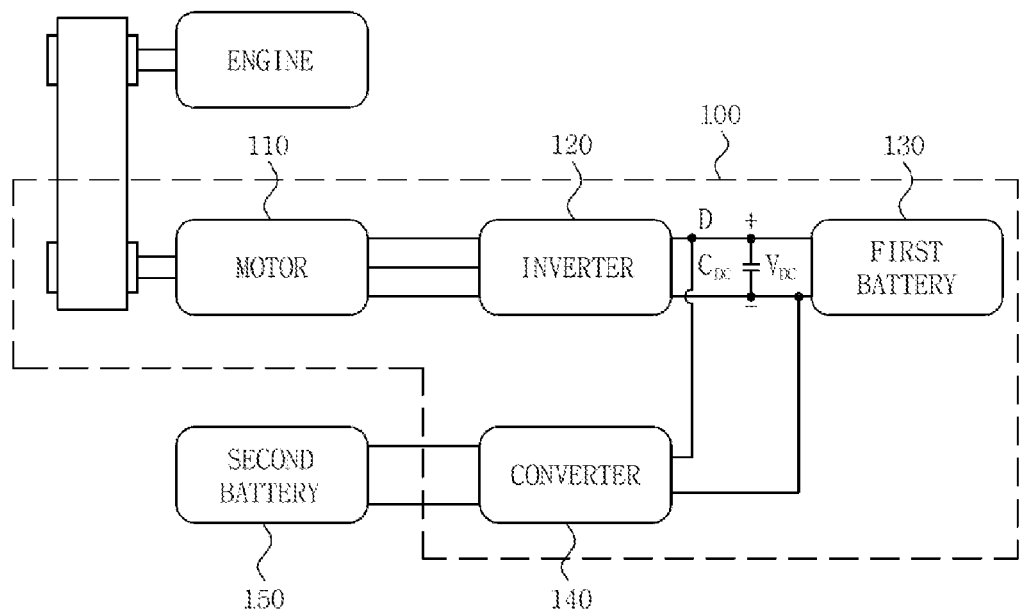
FIG. 1 is a block diagram of a driving circuit for a hybrid electric vehicle according to an exemplary embodiment of the present disclosure.

The objects, features and advantages of the present disclosure will be more clearly understood from the following detailed description of the exemplary embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present disclosure, when it is determined that the detailed description of the related art would obscure the gist of the present disclosure, the description thereof will be omitted.

Hereinafter, exemplary embodiments of the present disclosure will be described in detail with reference to the accompanying drawings. Start-up refers to a time point in which a key of a hybrid electric vehicle is turned on and a driving circuit for the hybrid electric vehicle is begun to be driven.

Figure 2:
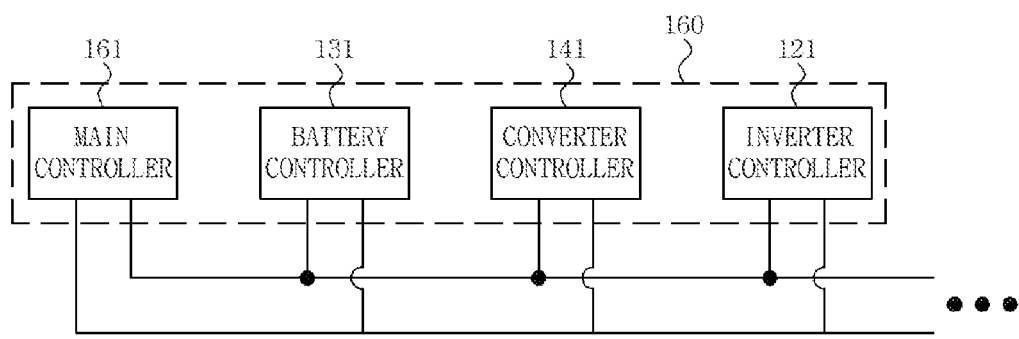
FIG. 2 is a diagram illustrating a network between processors of a hybrid electric vehicle according to an exemplary embodiment of the present disclosure.

FIG. 1 is a block diagram of a driving circuit for a hybrid electric vehicle according to an exemplary embodiment of the present disclosure, and FIG. 2 is a diagram illustrating a network between processors of a hybrid electric vehicle according to an exemplary embodiment of the present disclosure.

As illustrated in FIG. 1, the driving circuit for the hybrid electric vehicle according to an exemplary embodiment of the present disclosure includes a first battery 130 and a second battery 150 that are charged or discharged with a predetermined voltage according to an operating mode of a motor 110, an inverter 120 connected in series between the motor 110 and the first battery 130, a converter 140 connected in parallel between the second battery 150 and the first battery 130, and a processor 160 for comparing a voltage $V_{B1}$ of the first battery 130 and a voltage $V_{DC}$ of a DC-link capacitor $C_{DC}$ and controlling electrical connection between the first battery 130, and the inverter 120 and the converter 140 during start-up.

The motor 110 may be driven in an electromotive mode and a generative mode (regenerative mode) according to vehicle speed and engine efficiency, may drive the vehicle (electromotive mode) using only output of the motor 110 without operation of the engine in a driving area (a low-speed driving section and so on) with relatively low efficiency of a vehicle engine, and may drive the vehicle in a generative mode in which power is generated using the engine output and stored in the first and second batteries 130 and 150 in a high-speed driving section. Here, the motor 110 may be, but is not limited to, an alternating current (AC) motor or a direct current (DC) motor as an electric motor.

The first battery 130 and the second battery 150 may be charged or discharged with a predetermined voltage according to an operating mode (electromotive mode or generative mode) of the motor 110, and the first battery 130 includes a power switch 132 for electrical connection between the first battery 130, and the inverter 120 and the converter 140 through a switching operation. Here, the first battery 130 may be a lithium battery and voltages $V_{B1}$ and $V_{B2}$ of the first battery 130 and the second battery 150 may be 48 V and 12 V, respectively.

The inverter 120 is connected in series between the motor 110 and the first battery 130, converts a voltage applied from the first battery 130 to AC form when an operating mode of the motor 110 is a driving mode, and converts a voltage applied from the motor 110 to DC form when the operating mode is a generative mode (regenerative mode).

The converter 140 may be connected in parallel between the second battery 150 and the first battery 130 and may operate in a boost mode or a buck mode according to the operating mode of the motor 110. That is, the converter 140 may be a bidirectional DC-DC converter that is driven in a boost mode for boosting a voltage $V_{B2}$ of the second battery 150 and supplying the voltage $V_{B2}$ to the motor 110 or in a buck mode for bucking a voltage applied from the motor 110 and supplying the voltage to the second battery 150.

The processor 160 compares the voltage $V_{B1}$ of the first battery 130 and the voltage $V_{DC}$ of the DC-link capacitor $C_{DC}$ and controls electrical connection between the first battery 130, and the inverter 120 and the converter 140 during start-up of a driving apparatus of the hybrid electric vehicle.

Here, the DC-link capacitor $C_{DC}$ may include a first capacitor $C_1$ connected in parallel to the inverter 120 and a second capacitor $C_2$ connected in parallel to the converter 140, and the first capacitor $C_1$ and the second capacitor $C_2$ may have, but are not limited to, 700 uF and 330 uF, respectively.

That is, the processor 160 may control a switching operation of the power switch 132 according to the comparison result between the voltage $V_{B1}$ of the first battery 130 and the voltage $V_{DC}$ of the DC-link capacitor $C_{DC}$.

In more detail, the processor 160 controls the converter 140 to be driven in a boost mode and charges the voltage $V_{DC}$ of the DC-link capacitor $C_{DC}$ through a boost mode of the converter 140 when the voltage $V_{B1}$ of the first battery 130 is different from the voltage $V_{DC}$ of the DC-link capacitor $C_{DC}$.

As illustrated in FIG. 2, when the voltage $V_{DC}$ of the DC-link capacitor $C_{DC}$ reaches the voltage $V_{B1}$ of the first battery 130, the processor 160 may turn on a power switch of the first battery 130 so as to electrically connect the first battery 130, and the inverter 120 and the converter 140.

Here, the processor 160 includes a battery controller 131, a converter controller 141, an inverter controller 121, and a main controller 161 that are connected through controller area network (CAN) communication.

The battery controller 131 monitors a voltage state of charge (SOC) of the first battery 130 and the second battery 150 and controls a charging or discharging procedure of voltage of the first and second battery 130 and 150 according to the operating mode of the motor 110 and a switching operation (ON/OFF) of the power switch 132.

The converter controller 141 controls a driving mode of the converter 140 according to an operating mode (an electromotive mode or a generative mode) of the motor 110. That is, according to a control signal of the main controller 161, transmitted through CAN communication, the converter controller 141 may drive the converter 140 in a boost mode for boosting the voltage $V_{B2}$ of the second battery 150 and supplying the voltage $V_{B2}$ to the motor 110 or a buck mode for bucking a voltage supplied from the motor 110 and supplying the voltage to the second battery 150.

The inverter controller 121 controls driving of the inverter 120 according to the operating mode (an electromotive mode or a generative mode) of the motor 110. That is, according to a control signal of the main controller 161, transmitted through CAN communication, the inverter controller 121 controls the inverter 120 to convert a direct current (DC) voltage applied from the first battery 130 and the second battery 150 to the form of alternating current (AC) when the motor 110 is in an electromotive mode. In addition, when the motor 110 is in a generative mode, the inverter controller 121 controls the inverter 120 to convert an alternating current (AC) voltage applied from the motor 110 to the form of direct current (DC).

During start-up, the main controller 161 controls the battery controller 131, the converter controller 141, and the inverter controller 121 to control a switching operation of the power switch 132 according to the comparison result between the voltage $V_{B1}$ of the first battery 130 and the voltage $V_{DC}$ of the DC-link capacitor $C_{DC}$.

That is, during start-up of the motor 110, the main controller 161 detects the voltage $V_{B1}$ of the first battery 130 through the battery controller 131. In addition, when the voltage $V_{B1}$ of the first battery 130 is lower than the voltage $V_{DC}$ of the DC-link capacitor $C_{DC}$, the main controller 161 transmits a control signal to the converter controller 141 so as to control the converter 140 to operate in a boost mode and to charge the voltage $V_{DC}$ of the DC-link capacitor $C_{DC}$.

Furthermore, when the voltage $V_{DC}$ of the DC-link capacitor $C_{DC}$ reaches the voltage $V_{B1}$ of the first battery 130, the main controller 161 transmits a control signal to the battery controller 131 and controls a power switch to be turned on. Here, the main controller 161 transmits control signals for the inverter controller 121, the converter controller 141, and the battery controller 131 through CAN communication.

Hereinafter, with reference to FIGS. 2A to 5, a controlling method of a driving circuit for a hybrid electric vehicle according to an exemplary embodiment of the present disclosure will be described in more detail.

Figure 3A:
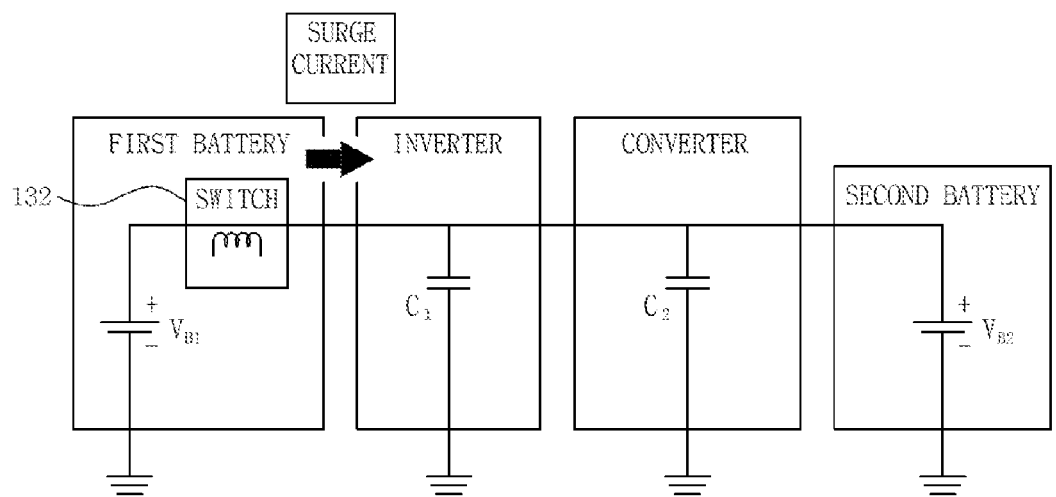
FIG. 3A is a diagram illustrating the case in which a controlling method according to an exemplary embodiment of the present disclosure is not applied to a driving circuit for a hybrid electric vehicle.
Figure 3B:
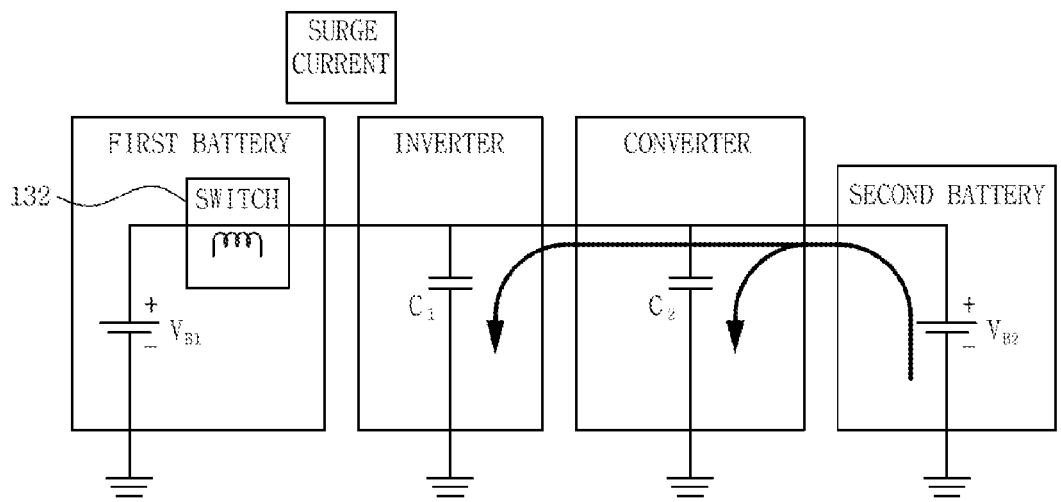
FIG. 3B is a diagram illustrating the case in which the controlling method according to an exemplary embodiment of the present disclosure is applied to a driving circuit for a hybrid electric vehicle.

FIG. 3A is a diagram illustrating the case in which the controlling method according to an exemplary embodiment of the present disclosure is not applied to a driving circuit for a hybrid electric vehicle, and FIG. 3B is a diagram illustrating the case in which the controlling method according to an exemplary embodiment of the present disclosure is applied to a driving circuit for a hybrid electric vehicle.

Figure 4:
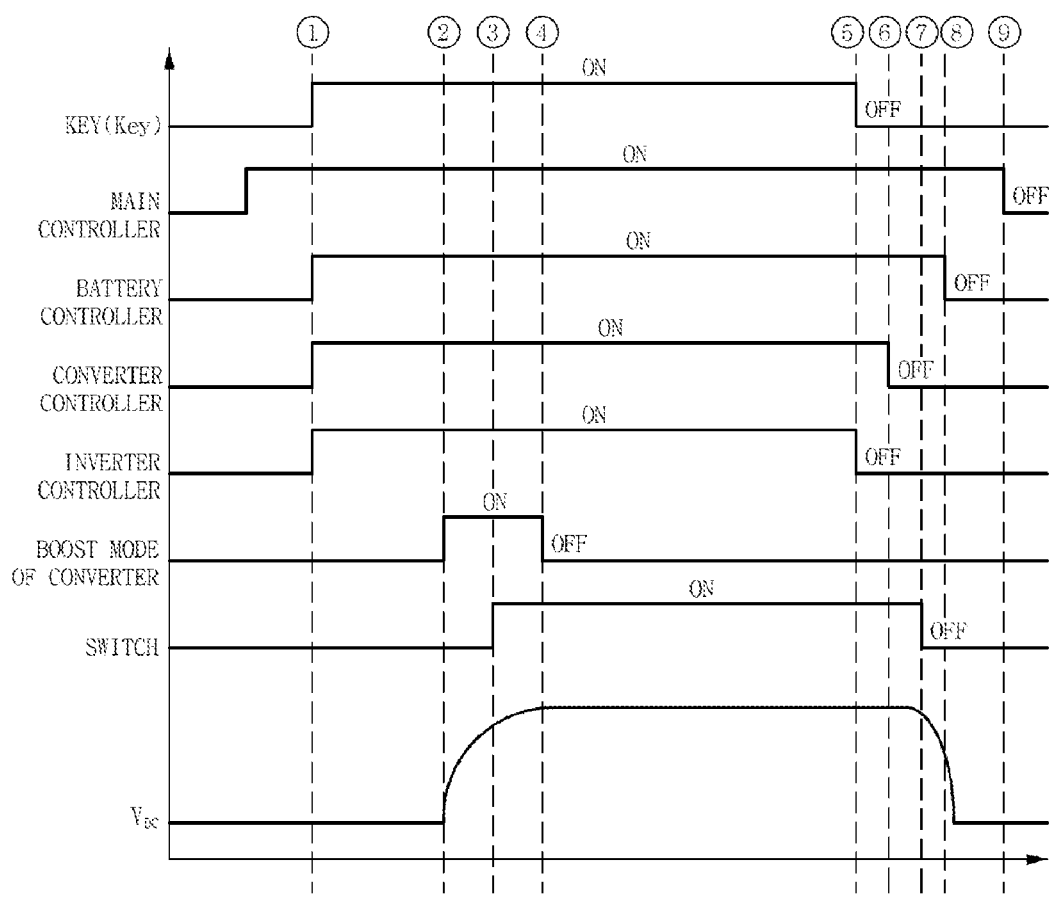
FIG. 4 is a timing diagram illustrating an operation of a driving circuit for a hybrid electric vehicle according to an exemplary embodiment of the present disclosure.
Figure 5:
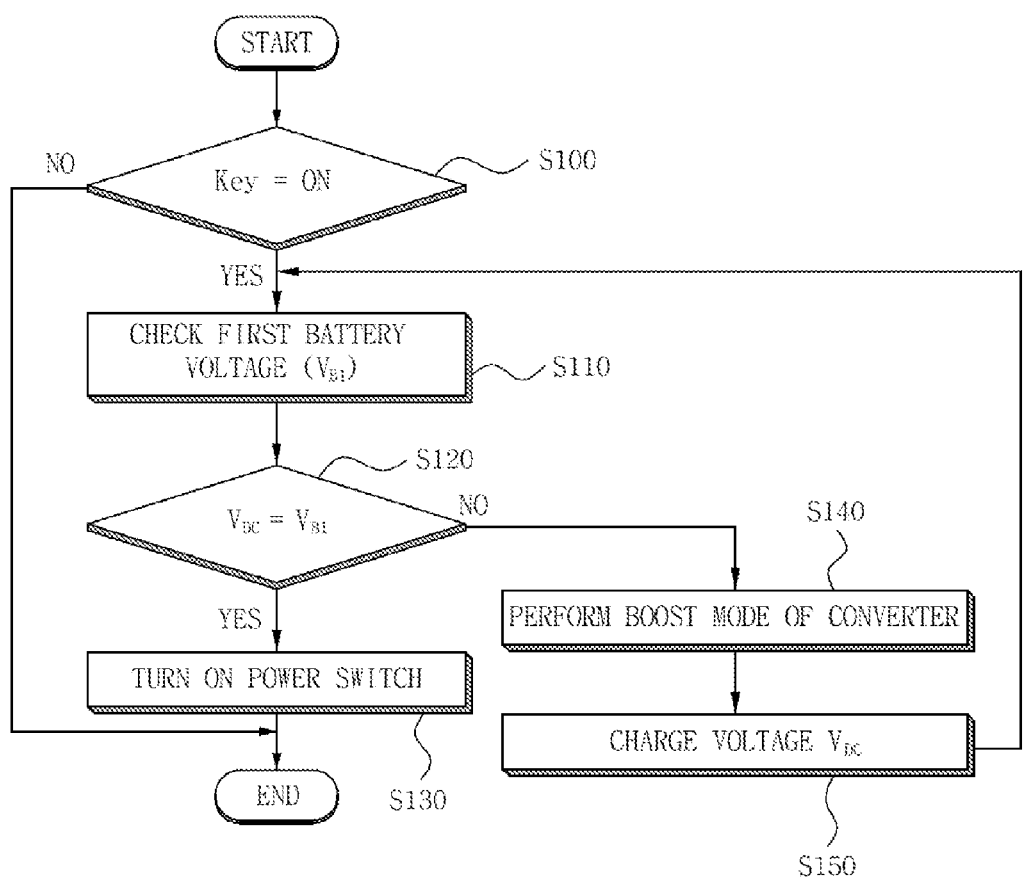
FIG. 5 is a flowchart illustrating a controlling method of a driving circuit for a hybrid electric vehicle according to an exemplary embodiment of the present disclosure.

FIG. 4 is a timing diagram illustrating an operation of a driving circuit for a hybrid electric vehicle according to an exemplary embodiment of the present disclosure, and FIG. 5 is a flowchart illustrating a controlling method of a driving circuit for a hybrid electric vehicle according to an exemplary embodiment of the present disclosure.

As illustrated in FIG. 3A, during start-up of a hybrid electric vehicle, in order to drive the motor 110, when the power switch 132 of the first battery 130 is turned on, surge current may be generated in a DC-link capacitor $C_{DC}$ of the power switch 132, the converter 140, and the inverter 120.

The surge current may damage components of the driving circuit. In order to prevent this, a battery disconnect unit (BDU) is used as a pre-charge circuit, but there is a limit in terms of manufacturing costs and an installation space due to a large volume.

Accordingly, as illustrated in FIG. 3B, during start-up of the hybrid electric vehicle, in order to drive the motor 110, before the power switch 132 of the first battery 130 is turned on, the voltage $V_{B1}$ of the first battery 130 is detected and then the voltage $V_{DC}$ of the DC-link capacitor $C_{DC}$ is charged using the converter 140. Furthermore, when the voltage $V_{DC}$ of the DC-link capacitor $C_{DC}$ reaches the voltage $V_{B1}$ of the first battery 130, the power switch 132 of the first battery 130 may be turned on so as to prevent surge current in the DC-link capacitor $C_{DC}$, which will be described below in detail.

As illustrated in FIGS. 4 and 5, in the controlling method of a driving circuit for a hybrid electric vehicle according to an exemplary embodiment of the present disclosure, the main controller 161 determines whether a key of the hybrid electric vehicle is turned on (timing ① of FIG. 4) and a driving circuit for the hybrid electric vehicle is started-up (S100). Here, when the key is turned on, the battery controller 131, the converter controller 141, and the inverter controller 121 are simultaneously turned on.

Then, prior to turning on the power switch 132 of the first battery 130, the main controller 161 detects the voltage $V_{B1}$ of the first battery 130 of the hybrid electric vehicle through the battery controller 131 (S110).

That is, the main controller 161 transmits a control signal to the battery controller 131 through CAN communication and the battery controller 131 transmits a voltage state of charge of the first battery 130 through CAN communication to the main controller 161.

In addition, the main controller 161 performs a voltage comparison operation for comparison between the voltage $V_{B1}$ of the first battery 130 and the voltage $V_{DC}$ of the DC-link capacitor $C_{DC}$ (S120).

That is, prior to turning on the power switch 132, the main controller 161 detects the voltage $V_{DC}$ of the DC-link capacitor $C_{DC}$ connected in parallel between the first battery 130, and the inverter 120 and the converter 140 and compares and determines whether the voltage $V_{DC}$ of the DC-link capacitor $C_{DC}$ is the same as the voltage $V_{B1}$ of the first battery 130.

Then the main controller 161 performs a switching controlling operation for controlling a switching operation of the power switch of the first battery according to the comparison result between the voltage $V_{B1}$ of the first battery 130 and the voltage $V_{DC}$ of the DC-link capacitor $C_{DC}$ (S120 to S150).

In detail, when the voltage $V_{B1}$ of the first battery 130 is different from the voltage $V_{DC}$ of the DC-link capacitor $C_{DC}$, the main controller 161 drives the converter 140 in a boost mode (S140).

That is, as illustrated in timing ② of FIG. 4, the main controller 161 transmits a control signal to the converter controller 141 through CAN communication and controls the converter 140 to be driven in a boost mode when the voltage $V_{B1}$ of the first battery 130 is different from the voltage $V_{DC}$ of the DC-link capacitor $C_{DC}$.

In addition, the voltage $V_{DC}$ of the DC-link capacitor $C_{DC}$ is charged through a boost mode of the converter 140 (S150). That is, during sections ② and ③ of FIG. 4, the main controller 161 controls the converter 140 to be driven in a boost mode to charge the voltage $V_{DC}$ of the DC-link capacitor $C_{DC}$.

Then the voltage $V_{DC}$ of the DC-link capacitor $C_{DC}$ is compared with the voltage $V_{B1}$ of the first battery 130 (S120), and when the voltage $V_{DC}$ of the DC-link capacitor $C_{DC}$ reaches the voltage $V_{B1}$ of the first battery 130, the power switch of the first battery is turned on (S130).

That is, the main controller 161 charges the voltage $V_{DC}$ of the DC-link capacitor $C_{DC}$ during a predetermined time period (sections ② to ④ of FIG. 4) through a boost mode of the converter 140 and then compares the voltage $V_{DC}$ of the DC-link capacitor $C_{DC}$ and the voltage $V_{B1}$ of the first battery 130.

Furthermore, upon determining that the voltage $V_{DC}$ of the DC-link capacitor $C_{DC}$ reaches the voltage $V_{B1}$ of the first battery 130 (timing ④ of FIG. 4), the main controller 161 controls the battery controller 131 to turn on the power switch 132 through CAN communication (timing ③ of FIG. 4). Here, when the voltage $V_{DC}$ of the DC-link capacitor $C_{DC}$ does not reach the voltage $V_{B1}$ of the first battery 130, operation S140 to S150 may be repeatedly performed.

In addition, when the voltage $V_{B1}$ of the first battery 130 and the voltage $V_{DC}$ of the DC-link capacitor $C_{DC}$ are the same, the main controller 161 controls the battery controller 131 to turn on the power switch 132 through CAN communication.

As set forth above, according to the exemplary embodiments of the present disclosure, a driving circuit for a hybrid electric vehicle and a controlling method thereof may charge a DC-link capacitor of an inverter and converter with the same voltage as a voltage of a first battery using a second battery and then electrically connect the DC-link capacitor to the first battery without a pre-charge circuit, thereby preventing surge current that may be generated during an electrical connection procedure of the first battery, the converter, and so on during a start-up procedure.

In addition, during start-up of the driving circuit for the hybrid electric vehicle, surge current may be prevented through a specific algorithm without a separate pre-charge circuit so as to ensure a competitive price of a product and to remove reasons for component failure due to a pre-charge circuit.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the disclosure.

Accordingly, any and all modifications, variations or equivalent arrangements should be considered to be within the scope of the disclosure, and the detailed scope of the disclosure will be disclosed by the accompanying claims.

What is claimed is:

1. A driving circuit for a hybrid electric vehicle, comprising:
 a first battery and a second battery that are charged or discharged with a predetermined voltage according to an operating mode of a motor;
 an inverter connected in series between the motor and the first battery and for converting an applied voltage to the form of direct current (DC) or alternating current (AC) according to the operating mode of the motor;

a converter connected in parallel between the second battery and the first battery and operating in a boost mode or a buck mode according to the operating mode of the motor; and a processor for comparing a voltage (VB1) of the first battery and a voltage of a DC-link capacitor and for controlling electrical connection between the first battery, the inverter and the converter during start-up, wherein the DC-link capacitor is connected in parallel to the first battery, the inverter, and the converter, and wherein the converter is a bidirectional DC-DC converter that is driven in the boost mode for boosting a voltage of the second battery and for supplying the voltage to the motor or in the buck mode for bucking a voltage supplied from the motor and for supplying the voltage to the second battery.

2. The driving circuit of claim 1, wherein the first battery includes a power switch for mutually and electrically connecting the first battery to the inverter and the converter through a switching operation.

3. The driving circuit of claim 2, wherein the DC-link capacitor includes a first capacitor connected in parallel to the inverter and a second capacitor connected in parallel to the converter.

4. The driving circuit of claim 3, wherein the processor controls the switching operation of the power switch according to a comparison result between the voltage ($V_{B1}$) of the first battery and the voltage of the DC-link capacitor.

5. The driving circuit of claim 4, wherein the processor controls the converter to be driven in the boost mode and controls the switching operation of the power switch of the first battery when the voltage ($V_{B1}$) of the first battery and the voltage of the DC-link capacitor are different.

6. The driving circuit of claim 5, wherein the processor charges the voltage the DC-link capacitor through the boost mode of the converter, and turns on the power switch of the first battery when the voltage of the DC-link capacitor reaches the voltage ($V_{B1}$) of the first battery.

7. The driving circuit of claim 2, wherein the processor includes:

a battery controller for controlling the first battery and the switching operation of the power switch;

a converter controller for controlling a driving mode of the converter;

an inverter controller for controlling driving of the inverter; and a main controller for controlling the battery controller, the converter controller, and the inverter controller to control the switching operation of the power switch according to a comparison result between the voltage of the first battery and the voltage of the DC-link capacitor during start-up.

8. The driving circuit of claim 7, wherein the main controller controls the battery controller, the inverter controller, and the converter controller through controller area network (CAN) communication.

9. The driving circuit of claim 7, wherein:

the main controller detects the voltage ($V_{B1}$) of the first battery through the battery controller during start-up of the motor, controls the driving mode of the converter to charge a voltage of the DC-link capacitor through the converter controller when the voltage ($V_{B1}$) of the first battery is lower than the voltage of the DC-link capacitor, and turns on the power switch through the battery controller when the voltage of the DC-link capacitor reaches the voltage ($V_{B1}$) of the first battery.

10. A controlling method of a driving circuit for a hybrid electric vehicle, the hybrid electric vehicles comprising:

a first battery and a second battery that are charged or discharged with a predetermined voltage accordina to an operating mode of a motor;

an inverter connected in series between the motor and the first battery and for converting an applied voltage to the form of direct current (DC) or alternating current (AC) according to the operating mode of the motor;

a converter connected in parallel between the second battery and the first battery and operating in a boost mode or a buck mode according to the operating mode of the motor; and a processor for comparing a voltage (VB1) of the first battery and a voltage of a DC-link capacitor and for controlling electrical connection between the first battery, the inverter and the converter during start-up, wherein the DC-link capacitor is connected in parallel to the first battery, the inverter, and the converter, and wherein the converter is a bidirectional DC-DC converter that is driven in the boost mode for boosting a voltage of the second battery and for supplying the voltage to the motor or in the buck mode for bucking a voltage supplied from the motor and for supplying the voltage to the second battery, the controlling method comprising:

detecting the voltage (VB1) of the first battery and the voltage of the DC-link capacitor during start-up; comparing the voltage (VB1) of the first battery and the voltage of the DC-link capacitor; and controlling a switching operation of a power switch of the first battery according to the comparison result between the voltage (VB1) of the first battery and the voltage of the DC-link capacitor.

11. The controlling method of claim 10, wherein the controlling includes: driving the converter in the boost mode when the voltage (VB1) of the first battery is different from the voltage of the DC-link capacitor; and turning on the power switch of the first battery when the voltage (VB1) of the first battery is the same as the voltage of the DC-link capacitor.

12. The controlling method of claim 11, wherein the driving includes:

charging the voltage of the DC-link capacitor through the boost mode of the converter;

comparing the voltage of the DC-link capacitor with the voltage of the first battery; and turning on the power switch of the first battery when the voltage of the DC-link capacitor reaches the voltage of the first battery.

* * * * *